(12) United States Patent
Harris

(10) Patent No.: US 6,588,944 B2
(45) Date of Patent: Jul. 8, 2003

(54) THREE COLOR DIGITAL GOBO SYSTEM

(75) Inventor: Jerry L. Harris, Las Vegas, NV (US)

(73) Assignee: Light and Sound Design Ltd., Birmingham (GB)

( * ) Notice: Subject to any disclaimer, the term of this patent is extended or adjusted under 35 U.S.C. 154(b) by 85 days.

(21) Appl. No.: 09/771,953

(22) Filed: Jan. 29, 2001

(65) Prior Publication Data

US 2002/0135858 A1 Sep. 26, 2002

(51) Int. Cl.[7] .......................... G02B 6/36; G02B 26/08; G02B 6/00; H04N 9/68
(52) U.S. Cl. ................. 385/88; 385/89; 385/115; 385/116; 385/901; 385/37; 362/551; 362/556; 362/232; 362/243; 362/296; 359/223; 359/224; 359/291; 348/239
(58) Field of Search ......................... 385/88, 89, 92, 385/49, 115, 116, 14, 147, 901, 37; 359/291, 223, 224; 382/217, 220, 190; 348/241, 239, 246; 362/232, 551, 556, 293, 296

(56) References Cited

U.S. PATENT DOCUMENTS

| | | | | |
|---|---|---|---|---|
| 5,053,765 A | * | 10/1991 | Sonehara et al. | 340/815.43 |
| 5,828,485 A | * | 10/1998 | Hewlett | 359/223 |
| 5,940,204 A | * | 8/1999 | Hewlett | 353/121 |
| 6,057,958 A | * | 5/2000 | Hunt | 348/246 |
| 6,188,933 B1 | * | 2/2001 | Hewlett et al. | 359/291 |
| 6,208,087 B1 | * | 3/2001 | Hughes et al. | 315/291 |
| 6,256,136 B1 | * | 7/2001 | Hunt | 345/418 |

* cited by examiner

*Primary Examiner*—Brian Healy
(74) *Attorney, Agent, or Firm*—Fish & Richardson P.C.

(57) ABSTRACT

A system of digitally controlling light output by producing separate control signals for different colors of light. The light is contained in an optical waveguide, either prior to shaping or after shaping. Each of the control signals is coupled to a digitally controlled device which controls the shape of the light output. The digital controlling device can be digital mirror devices, for example.

38 Claims, 2 Drawing Sheets

THREE COLOR DIGITAL GOBO SYSTEM

BACKGROUND

The U.S. Pat. No. 5,940,204 has suggested using a digital device to shape the contour and outlines of light that is projected through a high-intensity projector. Such a system may be used, for example, for stage lighting in theatrical and concert events. The Icon M™, available from Light and Sound Design, Ltd; Birmingham, England, uses this technique.

Different patents owned by Light and Sound Design, Ltd. suggest that the digital gobo should be formed from either a digital mirror, or from any other pixel level controllable digital device.

Cogent Light of Los Angeles, Calif. has technology that allows packaging a high intensity light beam into a form that allows it to be placed into a light waveguide, e.g., a fiber optic cable.

SUMMARY

The present application teaches a system of packaging light into a light waveguide such as a fiber optic cable, and adjusting the shape of the light using a digitally controllable, pixel level controllable light shaping element, such as a digital mirror device (DMD), available from Texas Instruments.

In one embodiment, the system controls and produces high-intensity light output using three separate digital gobo devices. The digital gobo devices can be separately controlled such that each digital gobo device receives information indicative of shaping a separate primary color. The primary colors are handled separately, and/or combined at the object of the high-intensity light output.

BRIEF DESCRIPTION OF THE DRAWINGS

These and other aspects will now be described in detail with reference to the accounts, wherein.

DETAILED DESCRIPTION

Details of a lighting instrument using a digital gobo are described in many patents owned by Light and Sound Design Ltd and the basic features are also present in Light and Sound Design's Icon M™ lighting fixture. The system described herein may use any of these basic features including details of computer-controlled cooling, and optics.

Figure 1:
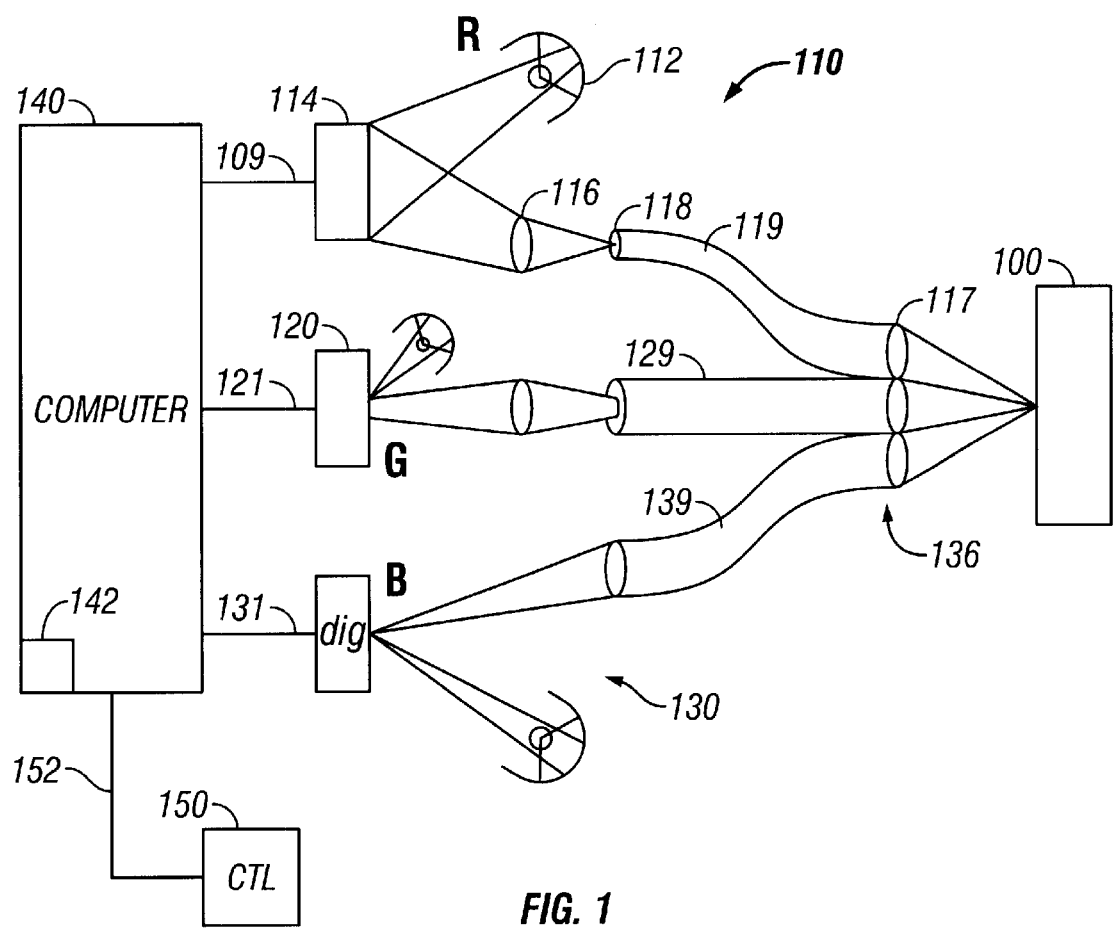
FIG. 1 is a block diagram of a three color version of the system.

A block diagram of the basic system is shown in FIG. 1. An object of lighting 100 is shown. This object may be a stage, or may be any other object which is conventionally by a high-intensity lighting device. The high-intensity lighting device may be, for example, a lighting device which produces more than 100 watts of lighting output, preferably more than 500 watts of lighting output. Devices of this type conventionally use a spotlight with a special high intensity bulb for producing the desired illumination effect.

In FIG. 1, three separate lighting units are formed. Each lighting unit is responsible for producing light of a separate primary color. The primary colors can be red, green and blue for additive colors, and cyan, magenta and yellow for subtractive coloration.

Each of the lighting units 110, 120 and 130 are formed of similar structure. The lighting unit 110 includes a light source 112 which produces light of a specified primary color, here red. The lighting unit 110 may produce red coloration, or may include a white light with a red filter, or may even produce pure white light which is later filtered. The light from source 112 is applied to digital gobo device 114. The digital gobo device 114 may be a digital mirror device available from Texas Instruments. Alternatively, the digital mirror device can be some other digitally controllable, pixel level controllable optical device such as, but not limited to, a grating light valve. The digital gobo device 114 is a controlling computer 140 which runs a specified program 142. A controller 150 may be remote from the computer 140, and connected to the computer by a line 152. For example, the computer 140 may be within a separate lighting fixture along with the lighting elements 110, 120 and 130, and a remote central controller 150 may be a lighting control console.

The light output from the digital mirror device 114 is focused by an optics assembly 116, and focused to the input end 118 of an optical waveguide 119. The optical waveguide 119 may be, for example, a fiber-optic device including single or multiple fibers. The light input at end 119 is output at end 117 and coupled towards the object 100. Analogously, the other lighting unit 120 focuses its light onto a fiber-optic device 129, and the lighting device 130 focuses its light onto a fiber-optic device 129. Each of the lights may have different characteristics, i.e. they may have different coloration. The output of the three fiber-optic devices 119, 129 and 139 are bundled together at area 136, and are pointed towards the object of lighting 100.

In this way, a number of advantages may be obtained. First, brighter light and different kinds of control may be obtained since the system disclosed herein uses three separate light sources. Moreover, better control over the digital gobo may be obtained since red; green and blue are separately controlled. Less flickering may be obtained, and more brightness, as compared with a system that uses only one DMD. Still a system that uses only one DMD is contemplated as described herein.

Different modifications on this system are possible. Other optical waveguides besides a fiber-optic pipe may be used in this system. Moreover, the optical filter which changes each of these separate light components to a separate light characteristic may be located after the digital mirror, e.g. as part of the optics assembly 116, or on the input end of the fiber-optic device 118.

Figure 2:
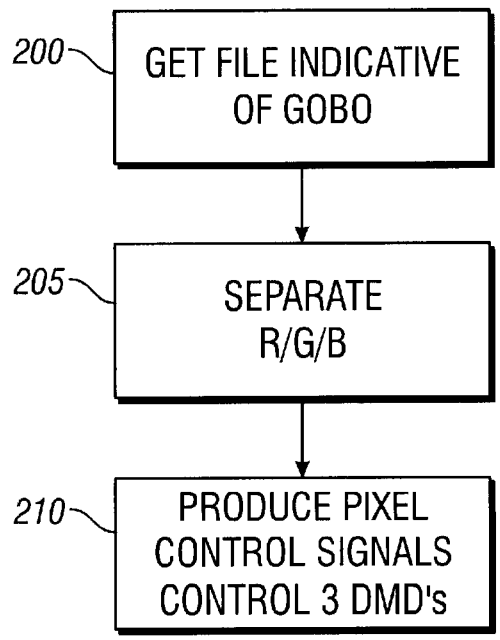
FIG. 2 shows a flowchart of operation of the controlling process for the digital gobo's in FIG. 1.

The system is controlled according to the flowchart of FIG. 2. At 200, a file indicative of a shaping of the light, e.g. a gobo to be used, is obtained. This file may be, for example, of the format described in U.S. Pat. No. 6,057,958. Of course, any file format can be used to define the gobo. The definition can be monochrome, gray scale, or full color (three different colors). At 205, the file is changed to an image, and separated into its primary color components. In the example given herein, the primary color components may include red, green and blue. Hence the file is separated into red, green and blue components. Such separation is conventional in video processing, and produces three separate signals. These three separate signals will eventually be used as the three separate controlling signals 109, 121 and 131 respectively driving the red green and blue subassemblies. The control of the three separate digital mirror devices is carried out at 210.

Figure 3:
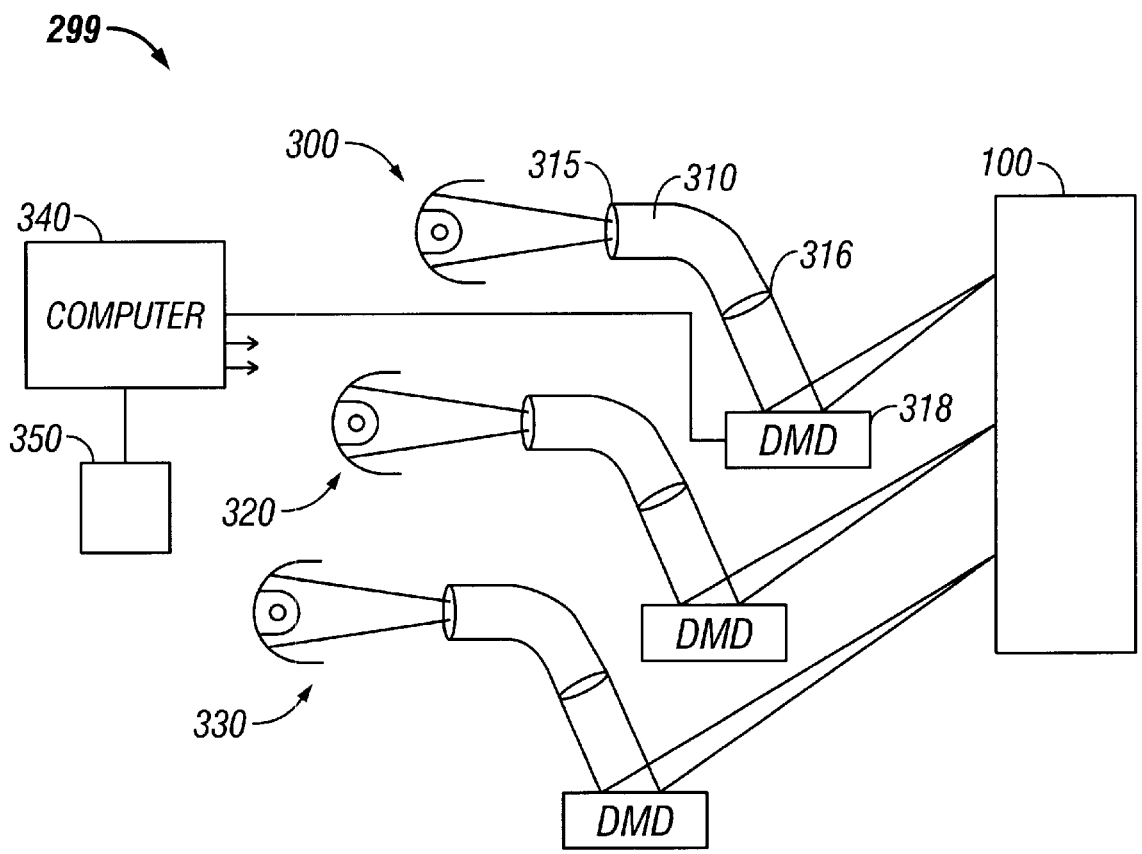
FIG. 3 shows a 3 DMD solution using three optical pipes.

FIG. 3 shows an alternative embodiment which uses a similar concept. In the FIG. 3 embodiment, light is first launched from a light source 300 directly into a fiber-optic cable 310. In this embodiment, the optics are shown as 315, and are formed directly on the input end of the fiber-optic cable 310. Light is launched into the fiber-optic cable, and hence may be focused and or colored by the optics 315. Of course, this system may also use the separate optics shown as 116 in the FIG. 1 embodiment. Light is output on the output in 316 of the fiber-optic cable 310, and coupled to a digital mirror device 318 which shapes the light and reflects it towards the object 100.

The above has described a first channel shown as 299. A separate second channel 320 produces a similar light alteration for the second aspect of light, while a third channel 330 produces a separate output for the third aspect of light; where the aspects can be colors. Each of the digital mirror devices may be controlled by the computer shown as 340 which may be controlled from a remote console 350.

While the above has described control using three separate colors, it should be understood that two separate colors could also alternatively be used. Moreover, while the above describes the different aspects of light which are separately controlled being colors, it should be understood that any different aspect of shaping the beam of light could be separately controlled. For example, one alternative might use different intensity lights, each of which are separately controlled to produce some other kind of effect.

Figure 4:
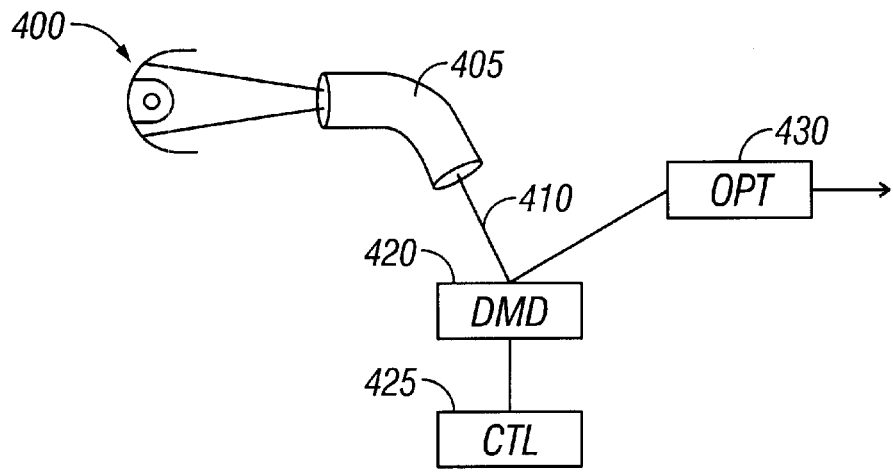
FIG. 4 for shows a single DMD solution.

Another embodiment is shown in FIG. 4. In this embodiment, a single DMD solution is shown. Light from the light 400 is immediately launched into an optical waveguide, e.g. fiber 405. The fiber can be located in any configuration. It produces its light output 410 at the area of DMD 420. As conventional, the DMD is controlled by a controller 425. An optical assembly 430 receives the light from the DMD, and transmits it towards the object of illumination. The optical element 430 may include a color changing element therein, or multiple color changing elements, in order to produce full-color output. For example, the optical element 430 may include a spinning Red/Green/Blue filter which spins in synchronism with the changing of patterns on the DMD.

Although only a few embodiments have been disclosed in detail above, other modifications are possible. All such modifications are intended to be encompassed within the following claims, in which:

What is claimed is:

1. A lighting system, comprising:
    a controller, obtaining a signal to be used to shape a beam of light and separating said signal into at least first and second different signals, each controlling a different aspect of shaping said beam of light;
    a first digital gobo shaping part, receiving said first signal, and shaping a light beam according to said first signal to produce a first shaped light beam part;
    a second digital gobo shaping part totally separate from said first digital gobo shaping part and, receiving said second signal, and shaping another light beam different than the first light beam according to said second signal to produce a second shaped light beam; and
    an optical output part, optically combining said first shape light beam and said second shape light beam to produce a composite shaped light beam at an output thereof.

2. A system as in claim 1, wherein each of said first and second digital gobo parts include a device which is pixel level controllable, and which changes a reflective state of each of a plurality of pixels separately.

3. A system as in claim 2, wherein said pixel level controllable device are digital mirror devices.

4. A system as in claim 2 wherein said pixel level controllable devices are grating light valves.

5. A system as in claim 1, wherein said optical output part includes a fiber-optic element, receiving input light at one end thereof, and coupling said input light to a second end.

6. A system as in claim 1, further comprising a third digital gobo part, receiving a third signal indicative of a third aspect of shaping said beam of light.

7. A system as in claim 1, wherein said different aspects of light are different colors of light.

8. A system as in claim 6, wherein said different aspects of light are different colors of light, and each of said first, second and third digital gobo parts respectively controls a part of a light shaping output optimized for a different primary color of light.

9. A system as in claim 8, wherein said optical output part includes three fiber-optic cables, each having a first end receiving a shaped light primary components, and a second end of each of said fiber-optic cables being located near one another to produce a composite output.

10. A system as in claim 8, wherein said optical output part further includes an optical element, focusing light on said optical output part.

11. A system as in claim 10, wherein said optical output part includes a plurality of optical cables thereof.

12. A system as in claim 1, wherein said optical output part comprises a plurality of fiber-optic cables, receiving shaped light at an input thereof, and positioned to produce output light in a common location.

13. A system as in claim 12, wherein said different aspects are different colors of light.

14. A system as in claim 1, wherein said optical output part comprises a plurality of fiber-optic cables, receiving a shaped light at an input end thereof, and positioned to produce an output light produced by said first and second digital gobo parts in a way that produces composite light output.

15. A system, comprising:
    a first subassembly, controlled by a first control signal, to produce shaped light indicative of and shaped according to a first color portion of a final desired light output;
    a second subassembly, controlled by second control signal, to produce second shaped light indicative of and shaped according to a second color portion of said final desired light output;
    a third subassembly, controlled by a third control signal, to produce third shaped light indicative of and shaped according to a third color portion of said final desired light output; and
    an optical system, respectively combining said first, second and third shaped lights to produce a composite shaped light.

16. A system as in claim 15, wherein each of said first, second and third subassemblies include digitally controlled light shape altering devices, each controlled by pixel-level signals, to produce an optically shaped signal configuration based on said pixel level signal.

17. A system as in claim is, wherein each of said digitally controlled light shape altering devices include digital mirror devices.

18. A system as in claim 16, wherein said optical system includes a plurality of optical fiber-optic devices, which couple light from a first location to a second location to produce said composite shaped light.

19. A system as in claim 17, wherein each of said fiber-optic devices receive unshaped light at an input thereof.

20. A system as in claim it wherein each of said first, second and third subassemblies all include a separate light source.

21. A system as in claim 20, wherein said first, second and third colors respectively represent primary colors.

22. A system as in claim 21, wherein said first, second and third colors respectively represent red, green and blue.

23. A system as in claim 16, wherein said optical system includes an optical waveguide, receiving shaped light at an input thereof, and coupling said shaped light to a location to be combined with other shaped light.

24. A lighting system, comprising:

a lighting element, producing a high intensity light output, greater than 100 watts;

a light waveguide, adjacent said lighting element, and positioned to receive said high intensity light output into an input of said light waveguide, said light waveguide guiding light to an output thereof; and a digitally controlled, pixel level light shape controlling element, controlled to shape light according to a specified controlling signal, receiving light from said output, and shaping said light from said output.

25. A system as in claim 24, further comprising a controller, obtaining a signal to be used to shape a beam of light and separating said signal into at least first and second different signals, each controlling a different aspect of shaping said beam of light;

and wherein said shape controlling element includes a first digital gobo part, receiving said first signal, and shaping a light beam according to said first signal to produce a first shaped light beam part; and a second digital gobo part, receiving said second signal, and shaping another light beam according to said second signal.

26. A system as in claim 24, further comprising an optical output part, optically combining said first shaped light beam and said second shaped light beam to produce a composite shaped light beam at an output thereof.

27. A system as in claim 24, wherein said pixel level controllable device are digital mirror devices.

28. A system as in claim 24 wherein said pixel level controllable devices are grating light valves.

29. A system as in claim 14, wherein said optical output part includes a fiber-optic element, receiving input light at one end thereof, and coupling said input light to a second end.

30. A system as in claim 25, wherein said different aspects of light are different colors of light.

31. A lighting system, comprising:

a light waveguide, coupled to receive light therein, and to couple said light from an input to an output; and a digitally controlled, pixel level light shape controlling element, controlled to shape light according to a specified controlling signal, optically coupled with said light waveguide to control a shape of light from said light waveguide.

32. A system as in claim 31, wherein said light waveguide includes a fiber optic cable.

33. A system as in claim 32, wherein said fiber optic cable is bent.

34. A system as in claim 32, further comprising a con roller, obtaining a signal to be used to shape a beam of light and separating said signal into at least first and second different signals, each controlling a different aspect of shaping said beam of light;

and wherein said shape controlling element includes a first digital gobo part, receiving said first signal, and shaping a light beam according to said first signal to produce a first shaped light beam part; and a second digital gobo part, receiving said second signal, and shaping another light beam according to said second signal.

35. A system as in claim 32, wherein said pixel level controllable device are digital mirror devices.

36. A system as in claim 32 wherein said pixel level controllable devices are grating light valves.

37. A system as in claim 17, wherein each of said fiber-optic devices receive shaped light at an input thereof.

38. A system as in claim 15, wherein each of said digitally controlled light shape altering devices are grating light valves.

* * * * *